US010808961B2

(12) United States Patent
Lau

(10) Patent No.: US 10,808,961 B2
(45) Date of Patent: Oct. 20, 2020

(54) ENERGY SAVING CONTROLLER

(71) Applicant: James Leych Lau, Orange, CA (US)

(72) Inventor: James Leych Lau, Orange, CA (US)

(*) Notice: Subject to any disclaimer, the term of this patent is extended or adjusted under 35 U.S.C. 154(b) by 0 days.

(21) Appl. No.: 16/036,796

(22) Filed: Jul. 16, 2018

(65) Prior Publication Data

US 2019/0128548 A1 May 2, 2019

Related U.S. Application Data

(63) Continuation-in-part of application No. 14/628,159, filed on Feb. 20, 2015, now Pat. No. 10,047,969, which is a continuation-in-part of application No. 14/332,714, filed on Jul. 16, 2014, now abandoned, and a continuation-in-part of application No. 14/016,012, filed on Aug. 30, 2013, now Pat. No. 9,410,713, application No. 16/036,796, which is a continuation-in-part of application No. 15/787,672, filed on Oct. 18, 2017, now Pat. No. 10,174,966, which is a continuation-in-part of application No. 14/628,159, filed on Feb. 20, 2015, now Pat. No. 10,047,969, which is a continuation-in-part of application No. 14/016,012, filed on Aug. 30, 2013, now Pat. No. 9,410,713, said application No.
(Continued)

(51) Int. Cl.
*F24F 11/30* (2018.01)
*F24F 11/46* (2018.01)
*G05B 19/042* (2006.01)
*F24F 11/61* (2018.01)
*F24F 11/77* (2018.01)
*F24F 11/86* (2018.01)
*G05B 15/02* (2006.01)
*G06Q 10/06* (2012.01)

(52) U.S. Cl.
CPC .............. *F24F 11/46* (2018.01); *F24F 11/61* (2018.01); *F24F 11/77* (2018.01); *F24F 11/86* (2018.01); *G05B 15/02* (2013.01); *G05B 19/042* (2013.01); *G06Q 10/06* (2013.01); *G05B 2219/2614* (2013.01)

(58) Field of Classification Search
CPC ............ F24F 11/46; F24F 11/30; G05D 23/19
See application file for complete search history.

(56) References Cited

U.S. PATENT DOCUMENTS 3,768,545 A 10/1973 Wills
4,152,902 A 5/1979 Lush
(Continued)

OTHER PUBLICATIONS

Analog Devices: MT-101 Decoupling Techniques copyright 2009.
(Continued)

*Primary Examiner* — Edward F Landrum
*Assistant Examiner* — Alexis K Cox
(74) *Attorney, Agent, or Firm* — Cionca IP Law P.C.; Marin Cionca

(57) ABSTRACT

A method for controlling an air handler including a fan, a heater and/or a compressor, by installing an energy saving controller between a thermostat and the air handler, shutting down the compressor or heater for a first predetermined duration if the compressor or heater has run continuously for a second predetermined duration during the current cycle, while allowing the fan to run for a fan's first run time extension amount equal with the first predetermined duration.

7 Claims, 3 Drawing Sheets

Related U.S. Application Data

15/787,672 is a continuation-in-part of application No. 15/093,669, filed on Apr. 7, 2016, now Pat. No. 10,119,719, which is a continuation-in-part of application No. 14/016,012, filed on Aug. 30, 2013, now Pat. No. 9,410,713, said application No. 15/787,672 is a continuation-in-part of application No. 15/344,483, filed on Nov. 4, 2016, now Pat. No. 10,066,849, which is a continuation-in-part of application No. 14/016,012, filed on Aug. 30, 2013, now Pat. No. 9,410,713, said application No. 15/787,672 is a continuation-in-part of application No. 14/332,714, filed on Jul. 16, 2014, now abandoned, which is a continuation-in-part of application No. 14/016,012, filed on Aug. 30, 2013, now Pat. No. 9,410,713.

(56) References Cited

U.S. PATENT DOCUMENTS

| | | | |
|---|---|---|---|
| 4,292,813 | A | 10/1981 | Paddock |
| 4,369,916 | A | 1/1983 | Abbey |
| 4,702,413 | A | 10/1987 | Beckey et al. |
| 4,759,498 | A | 7/1988 | Levine et al. |
| 4,773,587 | A * | 9/1988 | Lipman .............. G05D 23/1912 236/11 |
| 4,784,212 | A | 11/1988 | Brimer et al. |
| 4,817,705 | A * | 4/1989 | Levine .................... F23N 5/203 165/243 |
| 5,582,233 | A | 12/1996 | Noto |
| 5,650,697 | A | 7/1997 | Imagi et al. |
| 5,743,100 | A | 4/1998 | Welguisz et al. |
| 7,400,942 | B2 | 7/2008 | Cheng |
| 8,752,771 | B2 | 6/2014 | Warren et al. |
| 8,763,920 | B1 | 7/2014 | Walsh |
| 9,207,001 | B1 | 12/2015 | Roth et al. |
| 9,328,933 | B2 | 5/2016 | Walsh et al. |
| 9,417,005 | B1 | 8/2016 | Roth et al. |
| 9,500,386 | B1 | 11/2016 | Walsh et al. |
| 2002/0139130 | A1 | 10/2002 | Collins et al. |
| 2002/0187048 | A1 | 12/2002 | Meier et al. |
| 2003/0041605 | A1 | 3/2003 | Butcher et al. |
| 2004/0067050 | A1 | 4/2004 | Woodward et al. |
| 2004/0258533 | A1 | 12/2004 | Sato |
| 2005/0066667 | A1 | 3/2005 | Strauss |
| 2005/0082277 | A1 | 4/2005 | Jones et al. |
| 2006/0186214 | A1 | 8/2006 | Simon et al. |
| 2007/0267508 | A1 | 11/2007 | Hoglund et al. |
| 2008/0015739 | A1 | 1/2008 | Wacker |
| 2009/0261174 | A1 | 10/2009 | Butler et al. |
| 2016/0245544 | A1 | 8/2016 | Walsh et al. |
| 2017/0115025 | A1 | 4/2017 | Mowris et al. |

OTHER PUBLICATIONS

Principles of Electrical Engineering, by Vincent Del Toro, Second Edition 1972 at pp. 395-396.
ST Microelectronics application note: AN442 Application Note: Triac & Microcontrollers: The Easy Connection, copyright 2004.
The Art of Electronics, Horowitz & Winfieli, Second Edition 1989 pp. 8, 14, 45, 48, 566, 578.
Thermostatic Wiring Principles by Bob Scaringe, copyright 2011.
Mowris, R. Apr. 4, 2012. "Work Paper SCG0077 California HVAC Upgrade: Efficient Fan Controller® (EFC®)—Residential," US Copyright Office registration No. TX 8-187-702.
IBM Customer Engineering Manual of Instruction: Transistor Components, copyrighted 1959, 1960 by International Business Machines.
Walsh, John, Declaration of John Walsh Under 37 C.F.R. 1.132, 1 page, Apr. 4, 2017.
Walsh, John, GreenFan Probe Video Transcript, 11 p. May 19, 2011, YouTube.
Carrier, Installation, Start-up, and Service Instructions 58GA, 15 p., 1973, Carrier HVAC Partners.
Mowris, Robert, Declaration of Robert Mowris Under 37 C.F.R. 1.132, 1 page.
USPTO, Certificate of Registration for Work Paper PGE0077 California HVAC Upgrade: Efficient Fan Controller, 1 page, Jun. 16, 2016, USPTO, Washington, D.C.
Mowris, Robert, Work Paper PGE0077 California HVAC Upgrade: Efficient Fan Controller, 40 pages, published Mar. 21, 2012, Copyright Registration No. TX-8-247-632.
Green, Kenneth L., Summary of Prior Art, Third Party Submission Under 37 CFR 1.290 in U.S. Appl. No. 14/332,714.
Concise Description of Relevance, Third Party Submission Under 37 CFR 1.290 in U.S. Appl. No. 14/332,714, 7 pages.

\* cited by examiner

ENERGY SAVING CONTROLLER

CROSS-REFERENCE TO RELATED APPLICATIONS

This application is a continuation-in-part and claims the benefit of U.S. Non-Provisional application Ser. No. 14/628,159, filed Feb. 20, 2015, which is a continuation-in-part of U.S. Non-Provisional application Ser. No. 14/332,714, filed Jul. 16, 2014, and Ser. No. 14/016,012, filed Aug. 30, 2013, now U.S. Pat. No. 9,410,713, which are hereby incorporated by reference, to the extent that they are not conflicting with the present application.

BACKGROUND OF THE INVENTION

1. Field of the Invention

The invention relates generally to energy saving devices and methods for HVAC systems and particularly to a plug and play energy saving controller (ESC) to predict and extend the fan run time of HVAC systems after the heating or cooling unit has shut off and/or to stop the compressor or heater for a short duration of time if the compressor or heater has been running continuously for fixed periods of time, while the fan is still blowing.

2. Description of the Related Art

Conventional HVAC (Heating Ventilating and Air Conditioning) systems include temperature changing components for changing the temperature and condition of air. Indoor air handlers drive air from the temperature changing component through supply ducts to zones within a building. A typical HVAC consists of heating unit, air conditioning or cooling unit or heat pump unit, and the fan or blower at the air handler unit. A thermostat is used to control the conditions of the air in a conditioned space by sending control signals to the HVAC's relays or contactors to activate or deactivate one or more of the temperature changing components.

Conventional HVAC typically runs the ventilation fan for an additional 0 second to 90 seconds after the furnace or air conditional compressor has been turned off.

Studies have shown that even after this 90 seconds duration, the furnace surface and the air conditioner cooling coil still has some energy left. For example, most furnace heat exchangers are still hot (above 135 to 210° F.) after the furnace fan turns off. This wasted energy is not delivered to the conditioned space when the fan stops blowing.

Studies have also shown that if the cooling unit has been running continuously for a period of time of 20 minutes to 30 minutes, the cooling coil is wet and the evaporating of the water from the wet coil can provide additional cooling energy that can be harnessed. Also, if the heating unit has been running continuously for a period of time approximately 20 to 30 minutes, the furnace is at its maximum temperature, and by shutting down the furnace for a short period of time, but letting air flowing through it, it will not only reduce the furnace temperature therefore extending its life, but also harvest some residual heat energy for the conditioned room.

Therefore, there is a need for a plug and play energy saving controller that can easily be inserted between the thermostat and the air handler of an HVAC system to recover additional heating and cooling capacity and operate HVAC equipment at higher efficiency.

There are many manufacturers of thermostats where the fan output command signal goes into an unknown state where the signal could be any value between 0 Vac and 24 Vac (or 36 Vdc) from the residual capacitive charges, when the thermostat is shut off by putting the thermostat switch to system off or due to malfunction in the thermostat. In many cases, when the thermostat malfunctions, one of more of its outputs goes into a high impedance state or open circuit. When a thermostat is connected directly to the air handler unit, a high impedance state will not activate the HVAC relays or contactors and therefore, the HVAC system will remain off.

There are products in the market that are connected between the thermostat and the air handler unit controllers that cannot handle a state of unknown voltage level as inputs. A common case is the thermostat fan output signal being in unknown state when the thermostat is switched to OFF. These products would read this as ON state, and will turn the fan on and run continuously.

Therefore, there is a need to have a circuit to read any unknown voltage levels from the thermostat fan, cool or heat command signal as a known 24 Vac or 0 Vac steady state. In this way, the fan, compressor or heater will always be turned off when it is not at an ON state. Further, it would be desirable to provide a low cost controller installed between the thermostat and the air handler that will work for the majority of the thermostats in the market, that it would solve the unknown voltage state of the thermostat output signal after the thermostat is turned off and keeps the HVAC in OFF state, and that could be easily installed and operated by the user.

The problems and the associated solutions presented in this section could be or could have been pursued, but they are not necessarily approaches that have been previously conceived or pursued. Therefore, unless otherwise indicated, it should not be assumed that any of the approaches presented in this section qualify as prior art merely by virtue of their presence in this section of the application.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment a new plug and play energy saving controller (ESC) is provided to predict and extend the fan run time of HVAC systems after the heating or cooling unit has shut off and/or to stop the compressor or heater for a short duration of time if the compressor or heater has been running continuously for a fixed period of time, but with the fan still blowing. Thus, an advantage is the harnessing of otherwise wasted heating or cooling energy from the HVAC systems. Monitoring the previous cycle(s) for the compressor or heater on and off durations gives a better, more intelligent, comprehensive and efficient fan extension period, to save more energy. Further, shutting down the compressor or heater if they run continuously for, for example, 30 minutes, but keeping the fan running, will act like a fan extension and it saves energy.

In another embodiment, the new plug and play controller is inserted between the thermostat and the air handler unit. Thus, another advantage is the ease of installation of the controller.

In another embodiment the new plug and play controller is configured to change the unknown state of the thermostat's fan, cool or heat controller circuitry into a known state when the thermostat is switched to off or when the thermostat malfunctions. Thus, another advantage is the increased versatility of the provided controller by making it capable of functioning properly in connection with various manufacturers' thermostats.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which.

DETAILED DESCRIPTION OF THE PREFERRED EMBODIMENTS

Figure 1:
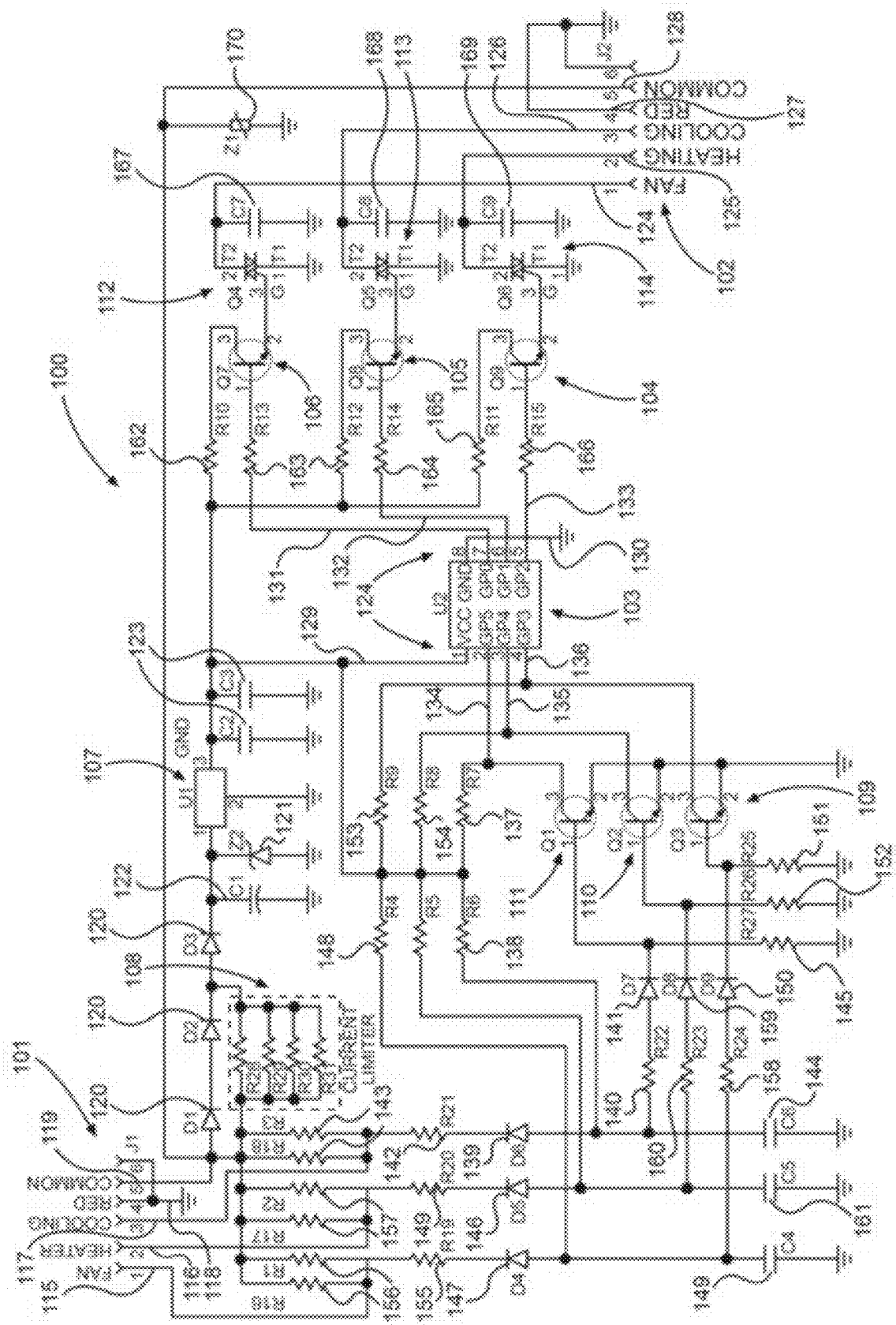
FIG. 1 illustrates a schematic circuit diagram of an integrated circuit for controlling the fan, the compressor and the heater of a heating, ventilation and air conditioning (HVAC) system.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

FIG. 1 illustrates a schematic circuit diagram of an integrated ESC circuit 100 for controlling the fan, the compressor and the heater of a heating, ventilation and air conditioning (HVAC) system. Preferably, the integrated circuit 100 comprises an input port 101 having a plurality of input terminals 101 and a plurality of output terminals 102, a voltage regulator 107, a microprocessor 103, transistors 109, 110, 111, 104, 105 and 106, and triacs 112, 113 and 114, whereby at least one of the plurality of input terminals 101 switches the transistors 109, 110 or 111 to a conducting state that turns on the microprocessor 103 which creates a trigger signal to turn on at least one of the plurality of triacs 104, 105, 106 which provides an output 102 of circuit 100 that enables the switching OFF or ON of at least one of the output terminals to ground.

The plurality of input terminals 101 connects the integrated circuit 100 to the thermostat of a HVAC system. The plurality of input terminals 101 includes typically a first input terminal 115, a second input terminal 116, a third input terminal 117, a fourth input terminal 118, and a fifth input terminal 119. The input terminal 119 has typically a common terminal voltage of 24 Vac with reference to the ground node of circuit 100.

The input terminal 118 gets its input from the thermostat's red color coded wire. In circuit 100, the terminal 118 is at 0 Vac with reference to the ground node.

The input terminal 115 gets its input from the thermostat's fan output line which is typically either a 24 Vac or a 0 Vac level. Sometimes, this line may be at unknown state as described earlier. The input terminal 116 gets its input from the thermostat's heat output line which is either a 24 Vac or a 0 Vac levels. Sometimes this line may be in high impedance state. The input terminal 117 gets its input from the thermostat's cool output line which is either a 24 Vac or a 0 Vac levels. Sometimes this line may also be in high impedance state.

The voltage regulator 107 acts as a constant voltage source to provide a constant voltage to the microprocessor 103 and the transistors 109, 110, 111, 104, 105 and 106.

The voltage regulator 107 is preferably fed from the output of a series of diodes 120 or diodes and current limiter 108. The capacitor 122 and Zener diode 121 are connected in parallel to the voltage regulator 107. The capacitor 122 and the Zener diode 121 provide a constant voltage to the voltage regulator 107. The capacitor 122 and the Zener diode 121 are connected in parallel with a variable voltage source and acts as voltage regulators to regulate the voltage across the voltage regulator 107. The Zener diode 121 clamps the voltage to the maximum specified voltage across the input terminal of the voltage regulator 107. The integrated circuit 100 has a parallel pair of output capacitors 123 to maintain the voltage regulator 107 output supply voltage.

The microprocessor 103 has a plurality of terminals 124 to provide triggering signals to the base of transistors 104, 105 and 106. Transistors 104, 105 and 106 are acting as drivers to provide drive signals to turn on or off the triacs 112, 113 and 114. The output terminals 102 are the outputs of triacs 112, 113 and 114.

As an alternate embodiment, the triacs 112, 113 and 114 can be replaced with any switchers, such as relays, contactors or multiplexers.

The plurality of output terminals 102 connects the integrated circuit 100 to the air handler unit of a HVAC system. The plurality of output terminals 102 includes a first output terminal 124, a second output terminal 125, a third output terminal 126, a fourth output terminal 127, and a fifth output terminal 128. The output terminal 128 has a common terminal voltage of 24 Vac with reference to circuit 100's ground node. The output terminal of 127 is the red color coded wire which is at 0 Vac with reference to circuit 100's ground.

The output terminal 124 goes to the air handler unit's fan input. Output terminal 125 to the air handler unit's heat input. Output terminal 126 to the air handler unit's cool input.

The turn on or turn off actions of the triacs 112, 113 and 114 will enable output terminals 124, 125 and 126 to be connected to ground or be in high impedance state. These in turn will control the operations of the air handler unit's solenoids to activate or deactivate the contactors or relays of the blower fan, compressor and gas/electric heater.

The plurality of terminals 124 of the microprocessor 103 includes a supply voltage terminal 129, a ground terminal 130, drive output terminals 131, 132, 133, and input terminals 134, 135, 136.

Terminal 134 of microprocessor 103 is driven by the collector of transistor 111 and the output of a control circuit derived from the input 117. This control circuit includes resistor 137, the output of voltage regulator 107, resistor 138, reverse biased diode 139, resistor 142, input 117, a pair of parallel resistors 143 and the input (common) terminal 101.

Similarly, terminal 135 of microprocessor 103 is driven by the collector of transistor 110 and a control circuits derived from the input 116.

Similarly, terminal 136 of microprocessor 103 is driven by the collector of transistor 109 and a control circuits derived from the input 115.

Transistors 109, 110 and 111 are npn transistors that act as switching elements and together with outputs derived from the inputs 116, 117 and 118 are connected to the microprocessor 103 to manipulate the output signals.

The base of transistor 111 is connected to input (cooling) terminal 117 and input (common) terminal 119, by a pair of parallel resistors 143 in series with resistor 142 and in series with diode 139, in series with resistor 140 and diode 141. The base of the transistor 111 has a capacitor 144 and a resistor 145 connected across and to ground. The collector of the transistor 111 provides the input to terminal 134 of the microprocessor 103 which controls the output (cooling) terminal 126. The emitter of transistor 111 is connected to circuit 100 ground.

Similarly, the same logic circuits applies for input (heater) terminal 116 to control the output (heater) terminal 125, and for input (fan) terminal 115 to control the output (fan) terminal 124.

The integrated circuit 100 has the diodes 120 in forward bias and diodes 139, 146 and 147 in reverse biased. The circuit 100 enables switching the HVAC fan to OFF if the thermostat fan output is in OFF or float or unknown state. Similarly, the circuit 100 enables switching the HVAC heater to OFF if the thermostat heat output is in OFF or float or unknown state. Similarly, the circuit 100 enables switching the HVAC cooling compressor to OFF if the thermostat cool output is in OFF or float or unknown state.

The circuit 100 process the float state of the thermostat output signals as it enters into circuit device 100 through input terminals 115, 116 and 117 and then outputs an OFF state signal in output terminals 124, 125 and 126.

The microprocessor 103 is programmed for energy efficient operation of the HVAC system by extending the fan run time of the HVAC blower fan based on the energy left over in the heater elements or in the air conditioning cooling coil and/or the rate of energy transfer (i.e., how fast the room gets heated up again in the case of a cooling cycle, or how fast the room gets cooled down again in the case of a heating cycle), as it will be described in more details hereinafter. The rate of energy transfer may be obtained by monitoring the on-off periods of prior cycles to estimate temperature differences between inside and outside and thus the rate at which the room is heated up or cooled down by its environment during the OFF period after the thermostat sends a command signal to have the HVAC fan shut off. Additionally, if the compressor (or heater, if HVAC system is in heating mode) has been running continuously for a predetermined period, for example, approximately 20-30 minutes, the microprocessor 103 will shut down the HVAC compressor (or heater) for, for example, 3 to 5 minutes while the fan continues to run, even though the thermostat did not send a command signal to have the compressor (or heater) shut down. The above two actions (i.e., extending fan run time and shutting the compressor or heater briefly) are independent of each other and controlled by the microprocessor 103. Shutting down the compressor or heater if they run continuously for, for example, 30 minutes, but keeping the fan running, will act like a fan extension and it saves energy.

The input terminal 115 voltage changes depending on the ON/OFF position of the fan. The first input terminal 115 is coming from the thermostat fan output command signal (color coded green wire) and has a voltage selected from a group consisting of 24 Vac, 0 Vac steady state and a unknown voltage value between 0 Vac and 24 Vac. The unknown value means that the input terminal 115 is not connected to either 24 Vac or 0 Vac, and can assume any value between 0 Vac and 24 Vac. The input terminal 119 always has a common terminal voltage of 24 Vac with reference to circuit's 100 ground.

In a typical operation of a thermostat, a 24 Vac thermostat output is an OFF state and ground or 0V thermostat output is an ON state. So, the thermostat turns on the fan by outputting a 0 Vac to the fan wire, etc. When the thermostat wants to turn OFF the fan, the input (fan) terminal 115 of circuit 100, and the input (common) terminal 119 of circuit 100 both has 24 Vac. The reversed biased diode 147 allows negative portion of the 24 Vac from input terminal 115, after passing through resistor 155, to be present at the anode of diode 147. The RMS voltage at the anode of diode 147 derived from input terminal 115 in series with resistor 155, is at least a negative 10 Vrms. From input (common) terminal 119, approximately 5 Vdc from the voltage regulator 107 in series with resistor 148, is also present at the anode of the diode 147. The resultant of the RMS voltage and the DC voltage is always negative which charges the capacitor 149 with a negative voltage as well. The diode 150 blocks this voltage from the base of transistor 109. The resistor 151 pulls the voltage of the base of transistor 109 to ground and cause the transistor 109 to be in off state. So, the input terminal 136 to microprocessor 103 is approximately 5 Vdc high from the output of voltage regulator 107 in series with resistor 153. The microprocessor 103 will manipulate its output 131 to low (0 volt) causing transistor 106 to shut off. This in turn shuts off the triac 112 and causes the circuit 100's fan output terminal 124 to be in high impedance state which turns the HVAC fan to off.

When the input terminal 115 has 0 Vac or ground, and the input (common) terminal 119 has 24 Vac, the 24 Vac of terminal 119 in series with resistor pairs 156 sinks to ground as the outputs of resistor pair 156 is connected to the input terminal 115 which has 0 Vac.

The anode of reverse bias diode 147 is now high from the 5 Vdc through resistor 148. The positive voltage at the anode of diode 147 cause the capacitor 149 to be charged to a positive voltage which in turn cause the forward bias diode 150 to conduct and turns on transistor 109. When transistor 109 conducts, the microprocessor 103's terminal 136 becomes low. Microprocessor 103 manipulates its output 131 to high and turns on transistor 106 which in turn turns on triac 112. The circuit 100's output (fan) terminal 124 becomes 0 Vac which turns on the fan of the HVAC system.

When the circuit 100's input terminal 115 is in unknown voltage state, the input 115 is not connected to either 24 Vac or 0 Vac. In the unknown voltage state, the voltage at terminal 115 is unknown. The voltage at terminal 119 has 24 Vac flowing through the pair of parallel resistor 156. The reverse bias diode 147 allows negative portion of this 24 Vac to be present at the anode of diode 147 which will charge the capacitor 149 to a negative voltage. The diode 150 blocks the negative voltage to the base of transistor 109, and the resistor 151 pulls the base of transistor 109 to ground turning transistor 109 to off state. This in turn cause a 5 Vdc present at terminal 136 of microprocessor 103 which cause 131 to go to low voltage shutting off transistor 106 and putting the triac 112 to off state. The circuit 100's output (fan) terminal 124 stays at high impedance state and the HVAC's fan is at OFF state thereby solving the problem of the unknown voltage inputs into terminal 115.

Similarly, the above applies to circuit 100's input (heater) terminal 116 and input (cooling) terminal 117 which can solve the unknown voltage states to these inputs.

Figure 2:
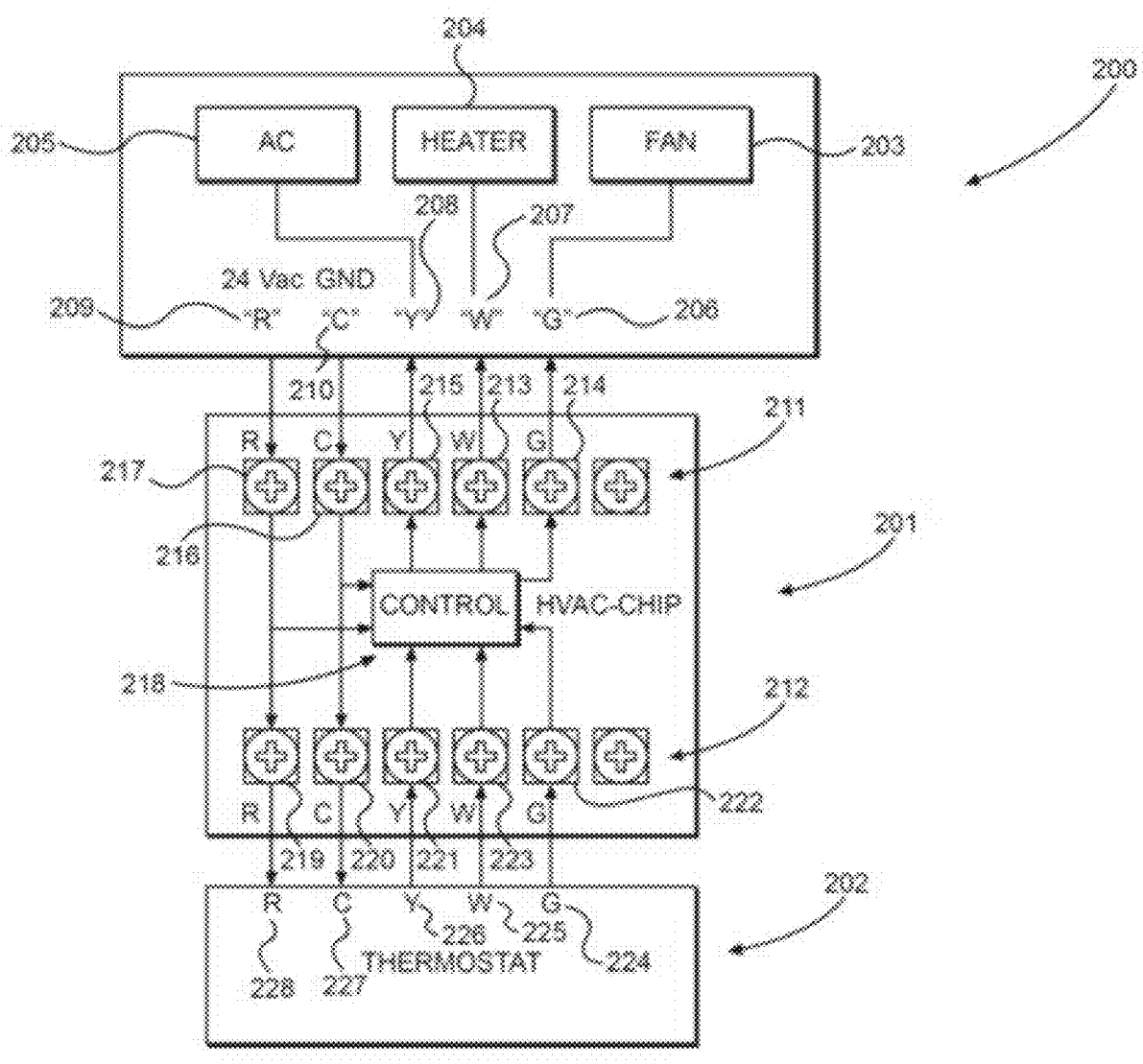
FIG. 2 illustrates a block diagram for controlling the fan, the heater and the AC of a HVAC system using the integrated circuit from FIG. 1.

FIG. 2 illustrates a block diagram of an integrated circuit 201 for controlling the fan 203, heater 204 and AC 205 of a HVAC Air Handler Unit 200. The integrated circuit's 201 configuration, and more specifically that of its controller 218, may be as that of the integrated circuit from FIG. 1. The HVAC 200 includes an air conditioner (AC) 205, a heater 204 and a fan 203 and the wire color coded green with its terminal 206, wire color coded white with its terminal 207, wire color coded yellow with its terminal 208, wire color coded red with its terminal 209, and a 24 Vac common wire and its terminal 210.

The integrated circuit 201 is as shown connected between the thermostat 202 and the HVAC air handler unit 200. The integrated circuit 201 includes output connectors 211, input connectors 212 and the controller 218. The output connectors 211 have wire lead terminals or screws terminals 214, 213, 215, 216 and 217 to connect to the HVAC 200. The input connectors 212 have wire lead terminals or screw terminals 222, 223, 221, 220 and 219 to connect to the thermostat.

From the output connector 211, the wire from the G terminal 214 is connected to the G terminal 206 of HVAC 200, wire from W terminal 213 is connected to the W terminal 207 of HVAC 200, wire from Y terminal 215 is connected to the Y terminal 208 of HVAC 200, wire from C terminal 216 is connected to the C terminal 210 of HVAC 200 and the wire from R terminal 217 is connected to the R terminal 209 of HVAC 200.

From the input connector 212, the wire from the G terminal 222 is connected to the G terminal 224 of thermostat 202, wire from W terminal 223 is connected to the W terminal 225 of thermostat 202, wire from Y terminal 221 is connected to the Y terminal 226 of thermostat 202, wire from C terminal 220 is connected to the C terminal 227 of thermostat 202 and the wire from R terminal 219 is connected to the R terminal 228 of thermostat 202.

When the thermostat 202 sends any control command instructions through its fan, heat or cool outputs, these instructions go into the integrated circuit 201, which acts as an energy saving controller (ESC) by manipulating these instructions and sending a revised set of energy savings command instructions to the HVAC 200, as disclosed herein. Further, the integrated circuit 201 continuously monitors the status of the thermostat 202, and will turn off the fan, heater or compressor if it detects a float or high impedance state of thermostat 202 due to a variety of reasons.

The ESC will adjust the fan operation automatically for heating using an algorithm derived from the stored energy left after furnace or heat pump has shut down and the rate at which the condition of the room is changed by its environment after the heater or air conditioning are in OFF condition. The algorithm will preferably be based on how long the heater has been running, and how long the heater was shut off (on off and on cycle) after the set temperature has been reached, in the first cycle, and then predict for the next cycle, how long the fan should continue to run based on the data from the previous cycle(s) and preferably the current cycle. So, the fan run time extension is preferably always predicted considering the data from the previous one on-off-on cycle or previous multiple on-off-on cycles.

When the thermostat calls for heat, the thermostat heat or 'W' output 225 in FIG. 2. goes typically to 0 Vac. This makes the input 116 in FIG. 1 goes to 0 Vac as well. The voltage regulator 107 output will create a positive DC voltage at the anode of diode 146, charges up capacitor 161 and create a positive DC voltage at the base of transistor 110. This turns on the transistor 110, and cause input 135 to microprocessor 103 to be at 0 Vac or low voltage state. The microprocessor 103 will then make output 133 go to approximately 5 Vdc or high voltage state. When output 133 is in high voltage state, transistor 104 turns on, and the regulator's 107 output through resistor 165 activates triac 114 which in turn pulls heater output 125 to 0 Vac. Heater output 125 in FIG. 1 is the same connection as output connector 213 of 201 in FIG. 2. Output 125 of FIG. 1 is therefore connected to heater input 'W' 207 of FIG. 2. This turns on the heater 204 of HVAC 200 in FIG. 2. In a HVAC system, if heater is a gas heater, the thermostat will not turn on the fan when there is a call for heat. If the heater is an electric heater or a heat pump, the thermostat will also turn on the fan when there is a call for heat.

Assuming an electric heater, when there is a call for heat, the thermostat fan or "G" output 224 in FIG. 2 goes to 0 Vac. Since 224 of FIG. 2 is connected to 222, which is the same terminal as input 115 of FIG. 1, this makes the input 115 goes to 0 Vac as well. This in turn turns on transistor 109, and cause input 136 to microprocessor 103 to be at low voltage state. The microprocessor 103 will then make output 131 go to high voltage state. When 131 is in high voltage state, transistor 106 turns on, and triac 112 is activated. This cause fan output 124 of integrated circuit 100 to go to 0 Vac. Fan output 124 of FIG. 1 is the same connection as terminal 214 of FIG. 2, which is connected to 206 and turns on the fan 203 of HVAC 200.

As described above, when there is a call for heat by the thermostat, the input 135 in FIG. 1 goes into a low voltage state. The microprocessor 103 records the duration of input 135 in low voltage state which is the heater ON time. When the room temperature has reached its upper hysteresis set temperature, the thermostat 202 heater output terminal 225 in FIG. 2 goes to 24 Vac. This in turn makes input terminal 116 of FIG. 1 goes to 24 Vac and turns off transistor 110, and cause input 135 be in high voltage state. The microprocessor 103 then causes its output 133 to low voltage state which turns off the heater. In addition, microprocessor 103 also record the duration of input 135 in high voltage state which is the heater OFF time. The software in the microprocessor 103 stores the data of heater previous cycle(s) ON time (input 135 in low voltage state), and heater previous cycle OFF time (input 135 in high voltage state) and the heater current cycle ON time. Then, at the end of the current heater ON cycle which is the next time this line 135 transitions from low to high voltage, the microprocessor 103 takes the previous cycle's heater ON time and Off time and the current ON time, and computes or predicts how long its output 131 (which controls the fan), should continue to remain at high voltage state to keep the fan ON at the end of current heater ON time.

Since the heater element in the heat exchanger gets to its maximum temperature fairly quickly (e.g., 7 minutes), by the microprocessor measuring the heater ON time it can be determined if the heater has reached its maximum temperature. After the heater elements have shut off, the microprocessor can estimate how much residual energy is left that can still be used to heat up the room, which determines with how much the fan run time should be extended.

In addition, the heater OFF time during the ON-OFF-ON cycle(s) indicates the rate at which the room cools down after the heater is OFF and this depends on the temperature difference between the room and the outside ambient and the environment of the room such as wall insulation, number of living occupants, heat generating appliances (electronic or electrical equipment, lights, computers, TV, etc.), and so on. If the heater OFF time is short, the fan extended run time should also be short as it takes faster for the residual heat energy left at the heat exchanger to cool down as well. This also will prevent cool air from circulating in the room.

As an example, if the room set temperature is 75° F. (75° F.+/−1° F. as hysteresis), and the outside temperature is 60° F., the heater may run for 20 minutes to get the room reached (76° F.). The heater then shuts off for let's say 10 minutes for the room to drop the temperature down to 74° F. and then it turns on again for let's say 15 minutes. From experiments we have conducted it was determined that all furnaces reached their maximum temperature after 7 minutes of burning. The furnace control board will usually let the fan continue to run for 90 seconds after it has shut down. We shall call this the default fan run time extension. So, an exemplary algorithm is to measure if this 7 minutes has been reached, and assign a 1 (one) minute fan extension, if it has been reached. For the 10 min of heater off, a 20% may be assigned as time extension, or 2 min. For the current heater ON time of 15 min (i.e., over 7 min), another 1 minute may be assigned as time extension. So, the total fan time extension is 4 (four) minutes in this example. The algorithm can then compare this total time to see if it is above the default extension time of 90 seconds, and if it is, then it will extend the fan run time with an additional 4 minutes minus 90 seconds, or 2.5 minutes additional fan run time. In the above example, if the heater was OFF for 6 minutes instead of 10 minutes, then the total fan time extension would be 1 min+1.2 min+1 min, which is 3.2 minutes. In this case, the software will ask the fan to extend for 3.2 min minus 90 seconds, or 1.7 minutes additional fan run time.

In addition, to increase the efficiency of the system even further, if the HVAC's heating elements have been operating continuously for a period of time (e.g., 20-30 minutes), they will be made by the ESC to shut down for a short period of time (e.g., 3-5 minutes) with the fan still running, to not only reduce the furnace temperature therefore extending its life, but also harvest some residual heat energy for the conditioned room.

For air conditioning, the same ESC will adjust fan operation automatically for cooling using an algorithm derived from the stored energy left in the water condensed on the cooling coils and the rate at which the room gets heated up, which depends on a number of factors including the room's insulation, number of occupants in the room, number of appliances operating in the room, temperature difference between the room and the outside ambient, etc., after the air conditioner has shut down. The algorithm will preferably be based on how long the compressor has been running, and how long the compressor was shut off (on-off-on) in previous cycle(s). When the thermostat calls for cool, in FIG. 2, thermostat 202 output 226 will go to 0 Vac. Since output 226 is connected to terminal 221 of 201 which is the same as input 117 in FIG. 1, the anode of diode 139 has a positive DC voltage from the output of regulator 107, through resistor 138 and charged up the capacitor 144 and turns on transistor 111. This in turn makes input 134 of microprocessor 103 to become low voltage state. Microprocessor 103 in turn will cause its output 132 go to high voltage state. Then, transistor 105 get turned on, and triacs 113 activated. This in turn causes cooling terminal 126 be in 0 Vac which make terminal 215 in FIG. 2 go to 0 Vac as well. This then turns on the AC compressor 205 of the HVAC 200. Also, when the thermostat calls for cool, the fan output 224 of thermostat 202 is also in 0 Vac which cause the fan 203 of HVAC 200 to be turned on as well. The microprocessor 103 records the duration of its input 134 in low voltage state (AC compressor ON) and in high voltage state (AC compressor OFF). Then, at the end of the next compressor ON cycle, the software makes its output 131 which controls the fan, to stay on for a predicted period of time after the end of the compressor ON period. This continues on, cycle after cycle, with the fan extension period based on the data from the previous compressor ON and OFF cycle(s) and current ON cycle. The predicted fan extension run time is computed by the software that uses the data of the previous cycle(s)' compressor ON, OFF and ON duration (see example below).

For example, based on an average air humidity of 50%, after the compressor has run for 20 minutes, the average AC condenser coil is typically dripping wet. This will be equivalent to maximum latent cooling energy, which is available when the water condensed in the coil is evaporated away. With fan blowing, it takes typically approximately 5 to 7 minutes to evaporate the water to dry with a 50% air humidity. So, by measuring how long the compressor is ON and assuming an average of 50% humidity for example, the ESC can extrapolate the estimated the available energy, and thus, how long the fan run extension should be, from the partially wet condenser coils if the AC is ON for less than 20 mins. For example, if the compressor has run for 10 minutes and the air humidity is 50%, the fan extension time may be 3 minutes. With the data on how long the AC compressor was OFF before it kicks on again, ESC can adjust this fan extension time further (see example below). It should be noted that this is for the situation when the compressor is ON for less than preferably 30 minutes continuously. If the compressor was ON for preferably 30 minutes, the microprocessor will shut down the compressor regardless if the room temperature has been reached or not, but keep the fan running for the next cycle.

Again, by monitoring the compressor ON time and compressor OFF time, the ESC also obtains an indication of the difference between the room temperature and the outside air temperature and the rate at which the room is heating up after the compressor is OFF.

For example, if the outside temperature is 100 degrees Fahrenheit (° F.) and the room set temperature is 75 degrees F. (assume a hysteresis of +/−1 degrees ° F.), the compressor could be running for 20 minutes before the room reached the 74 degrees F. (75° F.−1° F. hysteresis) and then the compressor goes to OFF maybe for 5 minutes. After the compressor is OFF, then the room will get heated up relatively fast due to 100 degrees F. outside. So, when the room temperature gets to 76 degrees F. (75° F.+1° F. hysteresis), the compressor is ON again and let's assume for 10 minutes before it reaches the set temperature again. The fan time extension algorithm may be to take 10% of previous ON period, which is 2 minutes ("mins"), plus 20% of the previous OFF period, which is 1 min, plus 20% of the current ON period which is 2 mins totaling 5 mins, which would mean to extend the fan run for 5 mins at the end of the current compressor ON time. However, if the outside temperature is only 85 degrees F., then, it takes longer for the room to be heated up to 76 degrees F. In this case, the compressor OFF time is maybe 7 minutes; and let's assume the compressor is ON again for 10 mins after that. So, the algorithm for fan extension at the end of this current 10 mins compressor ON time may be 2 min plus 1.4 min plus 2 min which total 5.4 minutes. So, by measuring the compressor ON time, and compressor OFF time, the ESC can estimate the temperature difference between outside air and room air, and the rate at which the room gets heated up after the compressor is OFF from other temperature changing activities in the room, thus, how long the fan extension run time should be. Thus, shorter fan extension run times will apply when the difference between the room temperature and the outside air temperature is greater, and vice versa.

If the HVAC's cooling elements have been operating continuously for a period of time (e.g., 20-30 minutes), they will be made by the ESC to shut down for a short period of time with the fan still running (e.g., 3-5 minutes) to harness the stored energy left in the water condensed on the cooling coil.

Hence, the ESC recovers and delivers more heating and cooling energy to the conditioned space than is possible with original controls from the thermostat. The ESC improves the efficiency of HVAC equipment by delivering additional heating or cooling capacity for a small amount of additional electric energy (kWh) utilized by the fan.

Air conditioners cool conditioned spaces by removing sensible and latent heat from the return air which reduces the supply air temperature and humidity. Latent heat is removed as water vapor is condensed out of the air due to the temperature of the evaporator coil being less than the return air dew point temperature. Latent heat is the quantity of heat absorbed or released by air undergoing a change of state, such as water vapor condensing out of the air as water onto a cold evaporator coil or cold water evaporating to water vapor which will cool the air.

Most evaporators are cold and wet (below 40 to 50° F.) after the compressor turns off. Cooling energy left on the evaporator coil after the compressor turns off is generally wasted. The evaporator absorbs heat from its surroundings and cold water on the coil flows down the condensate drain.

Again, the ESC as disclosed herein, recovers the remaining cooling energy from evaporator coil by operating the fan after the compressor turns off to cool the conditioned space. In addition, after the compressor has been running for a period of for example approximately 20-30 minutes, the evaporative coil is cold and wet, and by shutting down the compressor while keeping the fan running for, for example, 3-5 minutes, the water evaporating away at the evaporative coil cools down the incoming air flow from the ducting.

Again, most furnace heat exchangers are still hot (above 135 to 210° F.) after the furnace fan turns off. The ESC recovers the remaining heat energy from the hot furnace heat exchanger after the furnace turns off and delivers this heat to the conditioned space. In addition, after the heating element has been running for a period of for example approximately 20-30 minutes, the hot heat exchanger is at its maximum temperature, and by shutting down the heating element while keeping the fan running for, for example 3-5 minutes, the residual heat energy still heats up the incoming air flow from the ducting.

Again, as described earlier when referring to FIG. 2, the ESC works by preferably disconnecting from the original thermostat, all the original wires that come from the air handler unit, and re-connecting all these wires to the ESC module. A set of duplicate wires from the ESC is then directly connected to the thermostat (see FIG. 2).

When the thermostat sends out to the fan, compressor and heater signals, they now all go to the ESC. The ESC reads the signals from these wires coming from the thermostat and automatically sends out the desired signals described herein to the air handler unit that controls the HVAC.

Again, the ESC uses preferably all the outputs of the thermostat as its inputs. The command signal from the thermostat may be either a high of 24 Vac or 0 Vac (ground) or sometimes in unknown voltage state. Correspondingly, the ESC is configured to accept either 24 Vac or 0 Vac or float state as its inputs so that it can interface with every manufacturer's thermostats used in HVAC systems.

In another embodiment, a temperature sensor (not shown) can be installed in association with the ESC to sense the temperature of the outside air. The ESC can be installed inside the house next to the thermostat, or at the air handler in the garage or attic or outside the building on the roof for roof top units (RTU). If the ESC is installed inside the house, a remote temperature probe can be installed outside the house and sending the information to the ESC by RF signal. The purpose of this temperature sensor will be described hereinafter.

In yet another embodiment, the reversing valve signal from the thermostat may be read by the ESC. The reversing valve is identified as O/B terminal on the thermostat. In FIG. 2, the input terminals 212 will have an additional terminal (shown in FIG. 2 as unconnected terminal) to connect to the thermostat's reversing valve O/B output (not shown in FIG. 2). The ESC can read this output to do the following functionality. For heat pump HVAC system, the compressor is used in reverse to provide heat to the rooms. In this case, the ESC will read the reversing valve output (O/B) from the thermostat, and will preferably either disable the extend fan run time, or extend the fan run time to for example 25% of its programmed duration after the heat pump (compressor) has completed its cycle. For example, if the outside temperature is below 40 degrees Celsius (C), the additional fan run time or the compressor shut down with fan running may bring in very cold air. Therefore, it would be desirable to install a temperature sensor in association with the ESC to bypass the energy saving features described earlier in this disclosure if the outside temperature is sensed to be below a predetermined level (e.g., 40 degrees C.).

Also, preferably, for the heat pump mode, the ESC will not shut down the heat pump (compressor) for a few minutes after a continuous run of for example 20-30 minutes, to ensure no cold air is blowing into the room.

In another embodiment, a humidity sensor can be installed in in association with the ESC to sense the humidity of the outside air if the ESC is installed at the roof top, or the inside room air if the ESC is installed inside the building. During the summer, in some months and some parts of the country, the humidity could be for example over 75 percent. Since the energy saving feature of the ESC is based on the recovery of latent energy from evaporating away the water condensed onto the cooling coil, when the humidity is very high, the condensed water cannot be evaporated away. In addition, blowing high humidity air into the room with the compressor off is uncomfortable for many people. Therefore, it would be desirable to install a humidity sensor in the ESC to bypass the energy saving features if the outside humidity is for example over 75% or the inside humidity is over for example 65%. This bypass feature can be factory programmed or user programmed depending on the user's choice.

Figure 3:
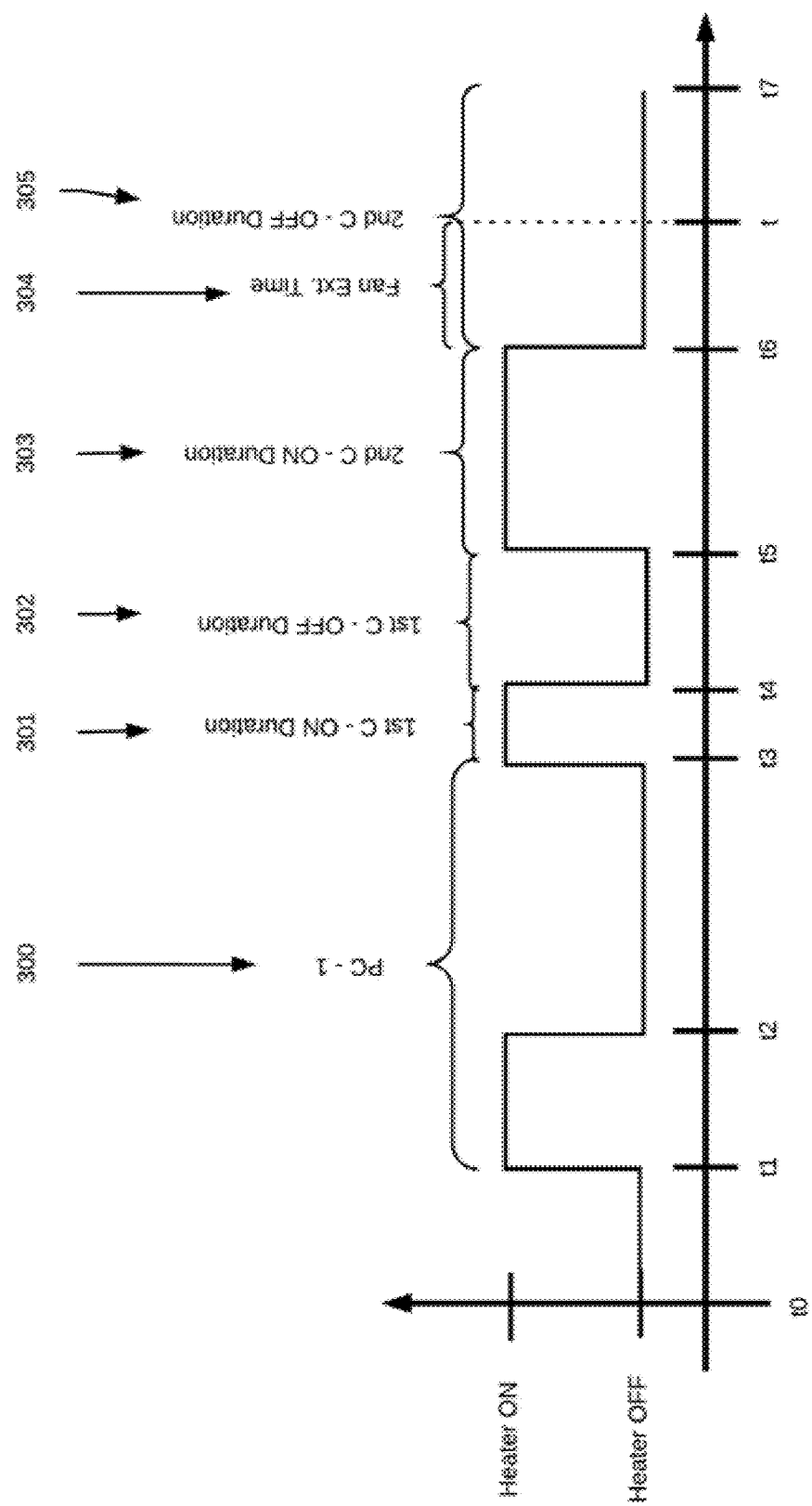
FIG. 3 illustrates an example of an ON-OFF-ON cycle diagram for a component (e.g., a heater) of an HVAC system equipped with the ESC described in FIG. 1 and FIG. 2, as the HVAC component turns ON and OFF to maintain the set room temperature.

FIG. 3 illustrates an example of an ON-OFF-ON cycle diagram for a component (e.g., a heater, a compressor) of an HVAC system, equipped with the previously described ESC, as the HVAC component turns ON and OFF to maintain the set room temperature. References will be made to a heater, assuming the HVAC system is in a heating mode, but it should be understood that this description applies similarly to a compressor. In other words, at time t0 the room is already at its set temperature and the periods of OFF and ON correspond to the room cooling down and being heated back up to its set temperature, respectively. Heater ON-OFF-ON cycles are asynchronous, non-periodic, and depend on many variables such as but not limited to outdoor temperature, conditioned room set temperature, insulation, number of occupants, open windows, etc.

Heater ON times are (t2−t1), (t4−t3), and (t6−t5). Heater OFF times are (t1−t0), (t3−t2), (t5−t4), and (t7−t6). Previous cycle (PC) on time is (t2−t1) and previous cycle off time is (t3−t2). First cycle on time (301) is (t4−t3) and first cycle off time (302) is (t5−t4). Second cycle on time (303) is (t6−t5) and second cycle off time (305) is (t7−t6). The fan extension time of the second cycle (304) is (t−t6), where t is between t6 and t7.

The fan extension time (304) of the second cycle as shown in FIG. 3 may be calculated as follows: Fan extension=(t2−t1)*y1+(t3−t2)*y2+(t4−t3)*y3+(t5−t4)*y4+(t6−t5)*y5 where y1, y2, y3, y4, and y5 are numerical fractions between 0 and 1 representing previously assigned percentages.

This method for determining the fan extension time of the second cycle can be extended to determine the fan extension time of any nth cycle.

Thus, the method for controlling the HVAC system to save energy in the process, involves monitoring one or more prior/first (i.e., "1st C" and "PC-1") complete cycles including their heater ON and OFF durations, and also the monitoring of the ON duration of the following, current/second (i.e., "2nd C") cycle in order to determine with how much to extend the fan run time and thus extract more energy from the system. This is very important, as emphasized by for example the microprocessor estimating how much residual energy is left that can still be used to heat up the room, which determines with how much the fan run time should be extended as described herein. Thus, by using a series of successive ON-OFF-ON cycle durations, the method can indirectly, but accurately, measure the impact of a multitude of variables that influence the efficient extraction of energy from the HVAC system using fan run extensions.

Again, the diagram illustrated in FIG. 3 and the associated descriptions are for the heater of an HVAC system. It should be understood that the same is true for the for the ON-OFF-ON cycles of the cooler/compressor of an HVAC system.

The apparatus and methods disclosed herein are suitable for split type central HVAC's or independent heater and compressor systems.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to.

Throughout this description, the embodiments and examples shown should be considered as exemplars, rather than limitations on the apparatus and procedures disclosed or claimed. Although many of the examples involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the described methods. Acts, elements and features discussed only in connection with one embodiment are not intended to be excluded from a similar role in other embodiments.

For means-plus-function limitations recited in the claims, the means are not intended to be limited to the means disclosed in this application for performing the recited function, but are intended to cover in scope any means, known now or later developed, for performing the recited function.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. A method for controlling an air handler including a fan and an HVAC component which is a member of the group consisting of a heater and a compressor, the method comprising: installing an energy saving controller for overriding a thermostat between the thermostat and the air handler, shutting down the the HVAC component for a first predetermined duration if the compressor or heater have run continuously for a second predetermined duration during a first cycle, while allowing the fan to run for a fan's first run time extension amount equal with the first predetermined duration, such that the fan never stops from the beginning of the second predetermined duration to the end of the first predetermined duration, and the fan continues to run when the HVAC component starts again at the end of the first predetermined period, to start a second cycle, immediately following the first cycle, and monitoring by the energy saving controller of ON and OFF durations of the HVAC component, in the first cycle, and of ON duration of the second cycle immediately following the first cycle, and determining the fan's second run time extension amount based on the ON and OFF durations of the first cycle and the ON duration of the second cycle and causing the fan to run for the second run time extension amount at the end of the ON duration of the current cycle.

2. The method of claim 1, wherein determining the fan's second run time extension amount comprises calculating a predetermined first percentage of the first cycle ON duration, calculating a predetermined second percentage of the first cycle OFF duration, calculating a predetermined third percentage of the second cycle's ON duration, and adding resulting time amounts.

3. The method of claim 1, wherein the first predetermined duration is 3-5 minutes and the second predetermined duration is 20-30 minutes.

4. The method of claim 1, wherein the installing an energy saving controller is performed by disconnecting from the thermostat's connectors all wires that come from the controller for the air handler, connecting all the wires to the corresponding energy saving controller's output connectors, and connecting a set of energy saving controller's input connectors to the thermostat connectors.

5. The method of claim 1, wherein the energy saving controller is configured to accept either a 24 Vac, a 0 Vac or an unknown or an indeterminate voltage level between 0 Vac and 36 Vac as its inputs from the HVAC component and the fan.

6. The method of claim 1, further comprising reading a reversing valve signal from the thermostat, reading a temperature sensor's signal sensing the temperature of outside air, and overriding the causing of the fan to run for the second run time extension amount at the end of the ON duration of the second cycle of the HVAC component and the allowing the fan to run for the first run time extension amount equal with the first predetermined duration if the outside air temperature is sensed to be below a predetermined level.

7. The method of claim 1, further comprising installing a humidity sensor in association with the energy saving controller for sensing air humidity and overriding the causing of the fan to run for the second run time extension amount at the end of the ON duration of the second cycle of the HVAC component and the allowing the fan to run for a fan's first run time extension amount equal with the first predetermined duration, when the air humidity is above a predetermined humidity level.

* * * * *